(12) United States Patent
Choi et al.

(10) Patent No.: US 11,505,172 B2
(45) Date of Patent: Nov. 22, 2022

(54) APPARATUS AND METHOD FOR REMOVING RUST ON A BRAKE DISK

(71) Applicants: HYUNDAI MOTOR COMPANY, Seoul (KR); KIA MOTORS CORPORATION, Seoul (KR)

(72) Inventors: Kwon-Hyoung Choi, Suwon-si (KR); Jong-Chan Jun, Incheon (KR); Deok-Hwan Seo, Incheon (KR); Jin-Hyung Lee, Seoul (KR); Gwi-Chul Kim, Hwaseong-si (KR); So-Ra Jang, Hwaseong-si (KR); Ho-Sung Hwang, Hwaseong-si (KR); Ki-Young Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 185 days.

(21) Appl. No.: 16/657,466

(22) Filed: Oct. 18, 2019

(65) Prior Publication Data
US 2020/0156614 A1 May 21, 2020

(30) Foreign Application Priority Data
Nov. 20, 2018 (KR) .......................... 10-2018-0143449

(51) Int. Cl.
*B60T 17/22* (2006.01)
*B60T 8/174* (2006.01)
*B60L 7/26* (2006.01)

(52) U.S. Cl.
CPC ............ *B60T 17/221* (2013.01); *B60T 8/174* (2013.01); *B60L 7/26* (2013.01)

(58) Field of Classification Search
None
See application file for complete search history.

(56) References Cited

U.S. PATENT DOCUMENTS

| 2013/0023382 A1* | 1/2013 | Ljungdahl ........... F16D 65/0037 477/185 |
| 2014/0171261 A1* | 6/2014 | Haneda .................... F16D 48/06 477/5 |
| 2017/0259671 A1* | 9/2017 | Kim .......................... B60L 7/26 |
| 2020/0043257 A1* | 2/2020 | Venkiteswaran ...... G07C 5/008 |

FOREIGN PATENT DOCUMENTS

| EP | 0874174 A2 | * | 10/1998 | ........... F16D 66/021 |
| JP | 2006103630 A | * | 4/2006 | |
| JP | 2008101654 | * | 5/2008 | |
| JP | 2012126288 | * | 7/2012 | |
| KR | 20110043848 A |   | 4/2011 | |
| KR | 101491370 B1 |   | 2/2015 | |

\* cited by examiner

*Primary Examiner* — Christian Chace
*Assistant Examiner* — Scott R Jagolinzer
(74) *Attorney, Agent, or Firm* — Lempia Summerfield Katz LLC (57) ABSTRACT

An apparatus for removing rust on a brake disk includes: an environment information acquisition unit configured to acquire environment information, a controller configured to perform a function of calculating an amount of generated rust using the environment information, and controlling the rust removal depending on whether or not the amount of generated rust exceeds the preset reference value, and a driver configured to drive a brake system under the control of rust removal.

14 Claims, 7 Drawing Sheets

APPARATUS AND METHOD FOR REMOVING RUST ON A BRAKE DISK

CROSS-REFERENCE TO RELATED APPLICATION

This application claims priority to Korean Patent Application No. 10-2018-0143449 filed on Nov. 20, 2018, which is incorporated herein by reference in its entirety.

BACKGROUND OF THE DISCLOSURE

Field of the Disclosure

The present disclosure relates to a technique for removing rust on a brake disk, and more particularly, to an apparatus and a method for removing rust on the brake disk capable of minimizing deterioration of fuel efficiency at the time of removing rust on the brake disk.

Description of Related Art

In a case where a brake disk is rusted due to leaving a vehicle parked for a long time, a very annoying noise such as "screech" is generated when the brake is stepped on very lightly to let the vehicle creep. The screeching noise is generated because the contact surface of the brake disk and the pad are uneven. This noise may be referred to as a "creep groan noise".

The creep groan noise is a common noise of the brake and has been inhibited by using improved materials for the brake disk and the pads and/or by the development of surface treatment techniques. However, the number of occurrences of the creep groan noise problem may increase due to the development of eco-friendly vehicles having a driving motor mounted therein.

The increase in occurrences of the creep groan noise problem may be due to the increased use regenerative braking in eco-friendly vehicles. This type of braking reduces the frequency of use of hydraulic braking. Therefore, the rust removal of the brake disk is reduced.

In addition, a reduction in the amount of regenerative braking and an increase in the amount of hydraulic braking in order to remove the rust, results in deterioration of fuel efficiency of the vehicle. When regenerative braking is limited, all kinetic energy is lost as heat energy. Therefore, deteriorating fuel efficiency for driving the vehicle may take place. Particularly, the energy recovery rate by regenerative braking is too high (about 20% to 50%) in the case of an electric vehicle. Thus, this results in deterioration of the driving range due to a loss in fuel efficiency.

In addition, when a material of the brake disk (for example, a nitride disk) is used to prevent rusting, this leads to a rise in costs.

SUMMARY OF THE DISCLOSURE

In order to solve the problems described in the Description of Related Art, an object of the present disclosure is to provide an apparatus and a method for removing rust on a brake disk. The disclosed apparatus and the method implement a logic to determine whether or not to enter into a rust removal mode and to be capable of minimizing deterioration of fuel efficiency when the regenerative braking is limited in order to remove rust on the brake disk.

In addition, another object of the present disclosure is to provide an apparatus and a method for removing rust on a brake disk, which implement a logic to efficiently determine the termination of the rust removal mode after entering into the rust removal mode.

In addition, still another object of the present disclosure is to provide an apparatus and a method for removing rust on a brake disk, which perform the rust removal for each case of generated rust (rain, leaving a vehicle parked for a long time, and vapor condensation and moisture content) and which are capable of effectively removing the rust.

In order to achieve the above-described objects, the present disclosure provides an apparatus for removing rust on a brake disk, which implements a logic to determine whether or not to enter a rust removal mode and to be capable of minimizing deterioration of fuel efficiency when the regenerative braking is limited in order to remove rust on the brake disk.

The apparatus for removing rust on a brake disk includes an environment information acquisition unit configured to acquire environment information. The apparatus further includes a controller configured to perform a function of calculating an amount of generated rust using the environment information and controlling the rust removal depending on whether or not the amount of generated rust exceeds a preset reference value. The apparatus also includes a driver configured to drive a brake system under the control of rust removal.

In addition, the environment information may be generated by using a measuring sensor installed in the environment information acquisition unit.

In addition, the environment information may be acquired from a weather center.

In addition, the amount of generated rust may be any one of an amount of generated rust in rain, in leaving the vehicle parked for a long time, in vapor condensation, and in vapor contact. The amount of generated rust in rain may be calculated by using a wiper operation during previous traveling and by using the measuring sensor. The amount of generated rust in leaving a vehicle parked for a long time may be calculated using a rust generation rate in leaving the vehicle parked for a long time set that is in advance by experimentation and using a duration of time the vehicle is left parked. The amount of generated rust due to vapor condensation may be calculated by an amount of condensed vapor, which is obtained by subtracting the minimum amount of saturated vapor during soaking, i.e., exposure from a vapor amount immediately before exposure, and a duration of time of vapor exposure. The amount of generated rust in vapor contact may be calculated by the vapor amount immediately before the exposure and a duration of the exposure time.

In addition, the amount of generated rust due to rain may be calculated during a period before turning off and starting of the vehicle. The amount of generated rust in vapor condensation may be calculated during a period after the starting and turning off the vehicle.

In addition, the environment information may be acquired from a weather center during exposure after starting the vehicle.

In addition, the amount of generated rust may be a maximum value in a plurality of the amounts of generated rust.

In addition, a control of rust removal may be maintained or controlled by comparing the maximum value of the amount of generated rust and an integral value of an amount of applied hydraulic pressure, which is obtained by integrating a product of a proportionality constant and a vehicle speed into the amount of applied hydraulic pressure, with a reference value of an allowable amount of rust removal set in advance.

In addition, the control of rust removal may be performed by reducing an allowable amount of regenerative braking and increasing an amount of hydraulic braking corresponding to the reduced allowable amount of regenerative braking.

In addition, the rust removal may be performed in proportion to the amount of hydraulic braking.

On the contrary, according to another embodiment of the present disclosure, a method for removing rust on a brake disk is provided. The method includes acquiring environment information by an environment information acquisition unit. The method further includes calculating an amount of generated rust using the environment information by a controller. The method also includes determining whether or not the amount of generated rust exceeds a reference value set in advance by the controller. The method further includes driving, by a driver, a brake system by executing the control of rust removal by the controller.

According to the present disclosure, when the amount of hydraulic braking is increased as much as the amount of generated rust for an appropriate time immediately after the vehicle starts, the rust is removed, and the noise disappears.

In addition, another effect of the present disclosure is that it is possible to reduce creep groan noise that otherwise increases in eco-friendly vehicles by effectively performing removal of the rust on the brake disk through the disclosed logic without raising costs of the vehicle.

In addition, still another effect of the present disclosure is that, when rust removal is performed after properly detecting a case for requiring rust removal, a rust removal mode is effectively terminated. Therefore, the deterioration of fuel efficiency is prevented.

DESCRIPTION OF SPECIFIC EMBODIMENTS

While the present disclosure is susceptible to various modifications and is capable of various embodiments, particular embodiments are shown in the drawings and are described in detail in the Description of Specific Embodiments section. However, it is to be understood that the present disclosure is not intended to be limited to the particular embodiments, but includes all modifications, equivalents, and alternatives falling within the spirit and scope of the present disclosure.

Throughout the disclosure, similar reference numerals are used to indicate similar parts. Terms such as "first" and "second" may be used to describe various components, but the components should not be limited by the terms. The terms are used solely for the purpose of distinguishing one component from another component.

For example, a first component may be referred to as a second component without departing from the scope of the present disclosure, and similarly, the second component may also be referred to as the first component. The term "and/or" includes any combination of a plurality of related listed items or any item of a plurality of related listed items.

Unless defined otherwise, all terms used herein, including technical or scientific terms, have the same meaning as commonly understood by one having ordinary skill in the art to which the present disclosure belongs.

Terms such as those defined in commonly used dictionaries should be interpreted as having a meaning that is consistent with the meaning in the context of the relevant art and will not be interpreted in an ideal or overly formal sense unless clearly defined herein.

Hereinafter, an apparatus and a method for removing rust on a brake disk according to the present disclosure is described in detail with reference to the accompanying drawings.

Figure 1:
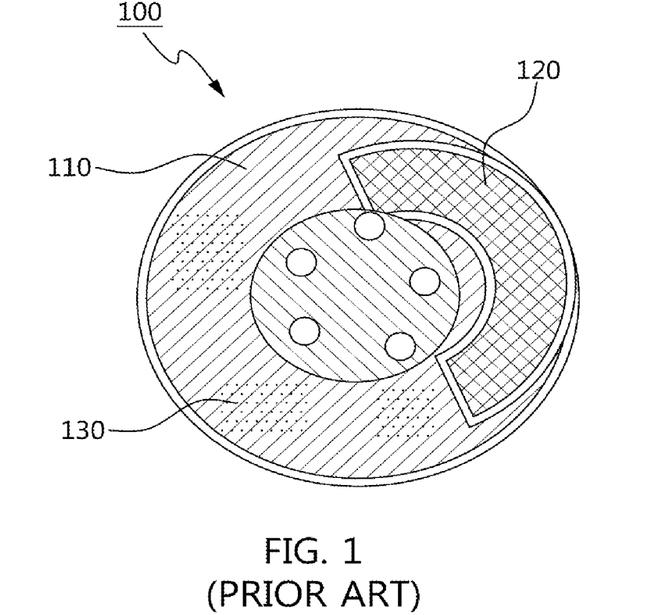
FIG. 1 is a diagram showing a configuration of a general brake system.

FIG. 1 is a diagram showing a configuration of a general or generic brake system. Referring to FIG. 1, a brake system 100 may be configured to include a brake disk 110, a brake caliper and pad 120 installed on the brake disk 110, and the like. Generally, rust 130 is generated on the brake disk 110 due to long-period of leaving a vehicle parked. In this embodiment, the vehicle may be an electric vehicle (EV), a hybrid electric vehicle (HEV), a plugin hybrid electric vehicle (PHEV), a fuel cell electric vehicle (FCEV), and the like.

Figure 2:
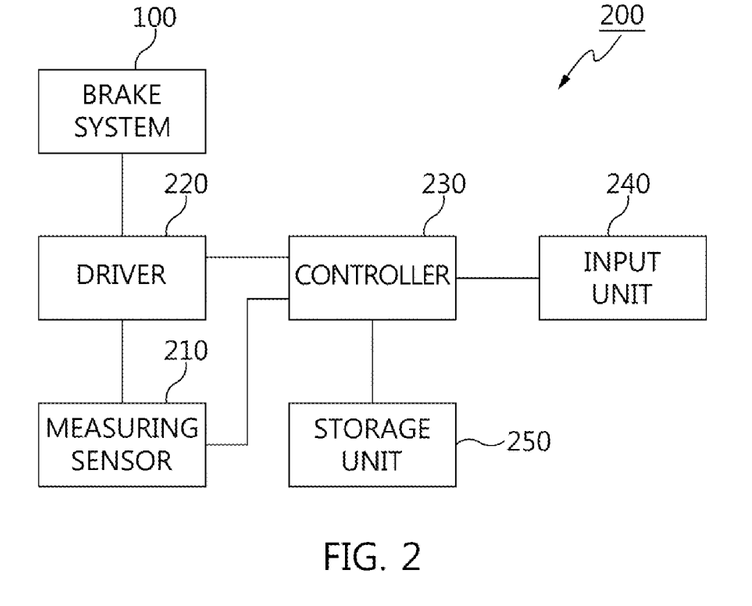
FIG. 2 is a block diagram showing a configuration of an apparatus for removing rust on a brake disk according to one embodiment of the present disclosure.

FIG. 2 is a block diagram showing a configuration of an apparatus 200 for removing rust on a brake disk according to one embodiment of the present disclosure. Referring to FIG. 2, the apparatus 200 for removing rust on a brake disk may be configured to include the brake system 100. The apparatus 200 is further configured to include an environment information acquisition unit 210 that acquires environment information. The apparatus 200 is also configured to include a controller 230 that calculates an amount of generated rust using the environment information and that controls rust removal depending on whether or not the amount of generated rust exceeds a preset reference value. The apparatus 200 for removing rust also includes a driver 220 that drives the brake system 100 under the control of rust removal. The apparatus 200 for removing rust on a brake disk may further include an input unit 240 that receives a command of the driver and a storage unit 250 that stores a program, data, and the like.

The environment information acquisition unit 210 performs a function of acquiring internal and/or external environment information of the vehicle. Examples of the environment information may include outdoor temperature, atmosphere, temperature, humidity, precipitation, and the like. To this end, the environment information acquisition unit 210 may be a measuring sensor for measuring the internal and/or external environment information of the vehicle. Examples of the measuring sensor may include a temperature sensor, a humidity sensor, a rain sensor, and the like.

Alternatively, it is possible to receive this environment information via communication from a weather center (not shown). In this case, the environment information acquisition unit 210 may be a telematics terminal. The telematics terminal may be generally configured to include a global positioning system (GPS) receiver, a microprocessor, and a communication circuit.

The environment information acquisition unit 210 may be configured to include all of the measuring sensor and the telematics terminal. In this case, some of the environment information may be acquired from the measuring sensor installed on the vehicle and the remaining environment information may be acquired from the weather center using the telematics.

The driver 220 operates the brake caliper and pad 120 under the control of the controller 230 to perform a function of compressing a pad of the brake caliper and pad 120 to the brake disk 110 and removing rust generated by friction. Examples of the driver 220 may include a hydraulic actuator, an electric actuator, and an electro-hydraulic actuator.

The controller 230 performs a function of calculating the amount of generated rust using the environment information and controlling the rust removal depending on whether or not the amount of generated rust exceeds the preset reference value.

The input unit 240 performs a function of receiving the command of the driver. At this time, the command may be an operation, a voice, touch, and the like. Therefore, the input unit 240 may be an operation key, a touch screen, a microphone, and the like.

The storage unit 250 performs a function of calculating the amount of generated rust using the environment information and storing a program, a software, data, environment information for implementing an algorithm executing the control of rust removal depending on whether or not the amount of generated rust exceeds the preset reference value.

Accordingly, the storage unit 250 may include at least one type of a storage medium such as a flash memory type memory, a hard disk type memory, a multimedia card micro type memory, a card type memory (for example, a secure digital (SD) memory, an extreme digital (XD) memory, or the like), a random access memory (RAM), a static random access memory (SRAM), a read only memory (ROM), a electrically erasable programmable read only memory (EEPROM), a programmable read only memory (PROM), a magnetic memory, a magnetic disk, and an optical disk. In addition, the storage unit 250 may operate in associated with web storage and a cloud server for performing a storage function on the Internet.

The apparatus 200 for removing rust on a brake disk may be configured to combine an engine, a motor, and the like according to the type of vehicle, in addition to the components shown in FIG. 2.

Figure 3:
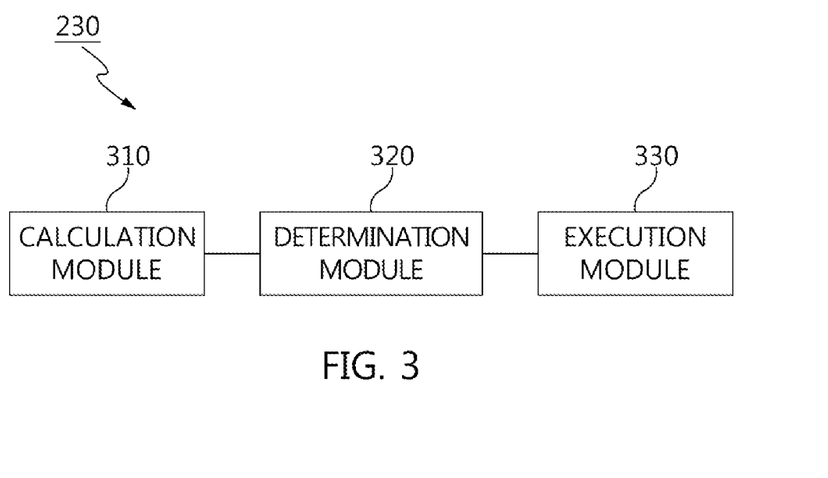
FIG. 3 is a block diagram showing a detailed configuration of a controller shown in FIG. 2.

FIG. 3 is a block diagram showing a detailed configuration of a controller shown in FIG. 2. Referring to FIG. 3, the controller 230 may be configured to include a calculation module 310 for calculating the amount of generated rust using the environment information, a determination module 320 for determining whether or not the amount of generated rust exceeds a preset reference value, and an execution module 330 for executing a control of rust removal for removing the rust 130 generated on the brake disk (110 in FIG. 1) depending on a result of the determination.

The term "module" shown in FIG. 3 refers to a unit for processing at least one function or operation. The module may be implemented by hardware or software or by a combination of hardware and software. The hardware implementation may be implemented as an application specific integrated circuit (ASIC), a digital signal processing (DSP), a programmable logic device (PLD), a field programmable gate array (FPGA), a processor, a controller, a microprocessor which are designed for performing the above-described functions, other electronic units or the combination thereof. The software implementation may be implemented as a module for executing the above-described functions. The software may be stored in the memory unit and executed by a processor. The memory unit or the processor may be adopted by various means well-known to those having ordinary skill in the art.

Figure 4:
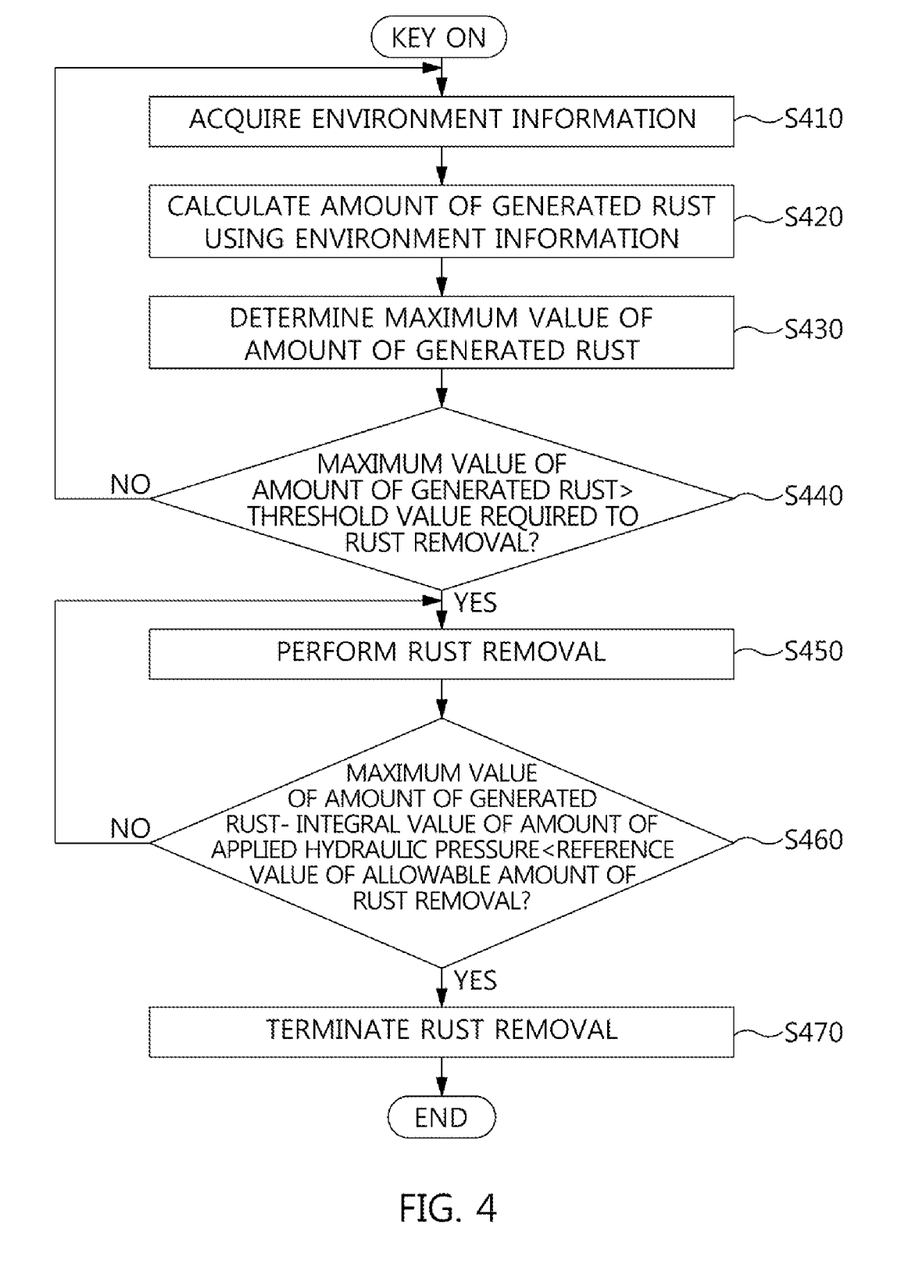
FIG. 4 is a flowchart showing a process of removing rust on the brake disk according to one embodiment of the present disclosure.

FIG. 4 is a flowchart showing a process of removing rust on the brake disk according to one embodiment of the present disclosure. Referring to FIG. 4, the environment information acquisition unit (210 in FIG. 2) acquires environment information, depending on the start of the vehicle (step S410). The environment information may be acquired by using a sensor installed on the vehicle or may be acquired by the weather center.

Thereafter, the controller 230 calculates an amount of generated rust using the environment information (step S420). The amount of generated rust may be an amount of generated rust in a case of rain, an amount of generated rust in a case of leaving a vehicle parked for a long time, an amount of generated rust in a case of vapor condensation, and an amount of generated rust in a case of contacting vapor. The amount of generated rust in rain is calculated using a wiper operation and the rain sensor in previous traveling of the vehicle. The amount of generated rust in leaving a vehicle parked for a long time is calculated by the rust generation rate in the case of leaving a vehicle parked for a long time (for example, 60%) set in advance by an experiment and a leaving time (for example, 1000 hours). The rust generation rate in leaving a vehicle parked for a long time may be a calibration value obtained from the experiment.

The amount of generated rust in vapor condensation is calculated by an amount of condensed vapor, which is obtained by subtracting the minimum amount of saturated vapor during soaking, i.e., exposure from the vapor amount immediately before exposure, and an exposure time (for example, 12 to 36 hr). The amount of generated rust in vapor contact is calculated by the vapor amount immediately before the exposure and the exposure time. In this embodiment, the term "exposure" means that the vehicle is left for a period of time in a given circumstance after completing a vehicle preheat process.

Thereafter, the controller 230 determines the maximum value of the amount of generated rust in any one of the cases (i.e., rain, leaving a vehicle parked for a long time, vapor condensation, and vapor contact) (step S430). Additionally, the amount of generated rust is effective to prevent quality problems by predicting adverse conditions, such that a value calculated under the adverse conditions of rain, leaving a vehicle parked for a long time, vapor condensation and contact, and moisture content is determined as the maximum value. The controller 230 calculates the amount of generated rust all the time, when any of the cases (rain, leaving a vehicle parked for a long time, vapor condensation/contact and moisture-containing) exceeds an amount required to perform rust removal. The controller 230 may perform the rust removal. The maximum value of the amount of generated rust is selected among the respective cases in one embodiment of the present disclosure, but the amount of generated rust is calculated several times even in one case, and among them, it is possible to select and determine the maximum value.

Thereafter, the controller 230 determines whether or not the maximum value of the determined amount of generated rust is greater than a threshold value required and set in advance for rust removal (step S440).

In step S440, when the maximum value of the amount of generated rust (for example, 7 based on 10) is less than the threshold value required to perform rust removal (for example, 8 based on 10), steps S410 to S430 are repeated.

On the contrary, in step S440, when the maximum value of the amount of generated rust is greater than the threshold value required for rust removal, the control of rust removal is performed (step S450). In other words, a pad of the brake caliper and pad (120 in FIG. 1) is compressed to the brake disk (110 in FIG. 1) by operating the driver (220 in FIG. 2) under the control of the controller 230 and remove rust generated by friction.

Thereafter, as represented by Expression 1 below, the controller 230 determines whether a value obtained by subtracting an integral value of an amount of applied hydraulic pressure from the maximum value of the amount of generated rust is less than a reference value of an allowable amount of rust removal set in advance (step S460). Additionally, an amount of rust removal is proportional to an amount of hydraulic braking, such that the product of a proportionality constant (a) and a vehicle speed integrates into the amount of hydraulic pressure at the time of hydraulic braking and subtracts the product from an initial amount of generated rust. Particularly, the vehicle speed is taken into consideration. Therefore, the more the vehicle brakes at a high speed, the more effective the rust removal is.

$$R - \int \alpha * Ps * v * dt < Ra \quad \text{[Expression 1]}$$

where:
R=Amount of Generated Rust
α=Proportionality Constant
Ps=Amount of Hydraulic Pressure at Time of Hydraulic Braking
v=Vehicle Speed
dt=Instantaneous amount of time
Ra=Reference Value of Allowable Amount of Rust Removal As a result of the determination in step S460, when the value obtained by subtracting the integral value of the amount of applied hydraulic pressure from the maximum value of the amount of generated rust is greater than the reference value of the allowable amount of rust removal set in advance, steps S450 to S460 are repeated.

On the contrary, as the result of the determination in step S460, when the value obtained by subtracting the integral value of the amount of applied hydraulic pressure from the maximum value of the amount of generated rust is less than the reference value of the allowable amount of rust removal, the control of rust removal is terminated (step S470).

Additionally, when an entry into a rust removal mode is determined under the control of rust removal, an allowable amount of regenerative braking is reduced and the amount of hydraulic braking is increased, so that it is possible to remove the rust naturally at the time of braking in driving. In addition, whenever the hydraulic braking is performed, the amount of applied hydraulic pressure is integrated to predict an amount of rust removal. When the value obtained by subtracting the integral value of the amount of applied hydraulic pressure from the maximum value of the amount of generated rust is less than the reference value of the allowable amount of rust removal, the rust is removed and the rust removal mode is terminated. The amount of regenerative braking returns to a normal range at the time of terminating the rust removal mode.

Figure 5:
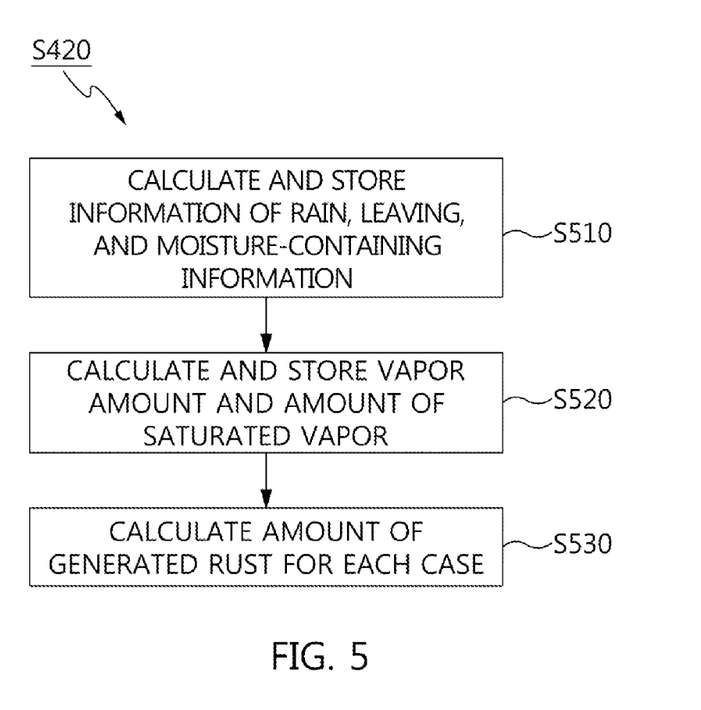
FIG. 5 is a flowchart showing a detailed step of calculating an amount of generated rust shown in FIG. 4.

FIG. 5 is a flowchart showing steps of calculating an amount of generated rust shown in FIG. 4. Referring to FIG. 5, a wiper operation time during a period before the turning off and starting the vehicle, an average value measured by the measuring sensor, and a vapor amount immediately before exposure are checked and stored in the storage unit 250 (step S510). Additionally, in a case of calculating the wiper operation time, the wiper operation time after starting the vehicle is integrated and stored in the storage unit 250 at the time of turning off the vehicle. In addition, in a case of the average value of an amount measured by the measuring sensor, the amount measured by the measuring sensor (particularly, a rain sensor) after starting the vehicle is averaged and stored in the storage unit 250 at the time of turning off the vehicle. In a case of the vapor amount immediately before exposure, the vapor amount at the time of turning off the vehicle is calculated and stored in the storage unit 250. In a case of calculating the minimum amount of saturated vapor during exposure, the minimum amount of saturated vapor during exposure is calculated from the minimum temperature during a period after starting and turning off the vehicle and a value obtained from relative humidity (RH) and atmosphere at this time is stored in the storage unit 250 (step S520).

Additionally, the controller 230 is woken up periodically during exposure, compares the stored value with the previously stored value to obtain the minimum outdoor temperature and a value obtained from relative humidity/atmosphere at this time. Or, after starting the vehicle, the controller 230 may receive the minimum outdoor temperature and the value obtained from relative humidity/atmosphere at this time from a telematics center (not shown) during exposure.

After that, the amount of generated rust is calculated for each case (i.e., rain, leaving a vehicle parked for a long time, vapor condensation, and vapor contact) (step S530).

The calculation of the amount of generated rust for each case is as follows.

Figure 6:
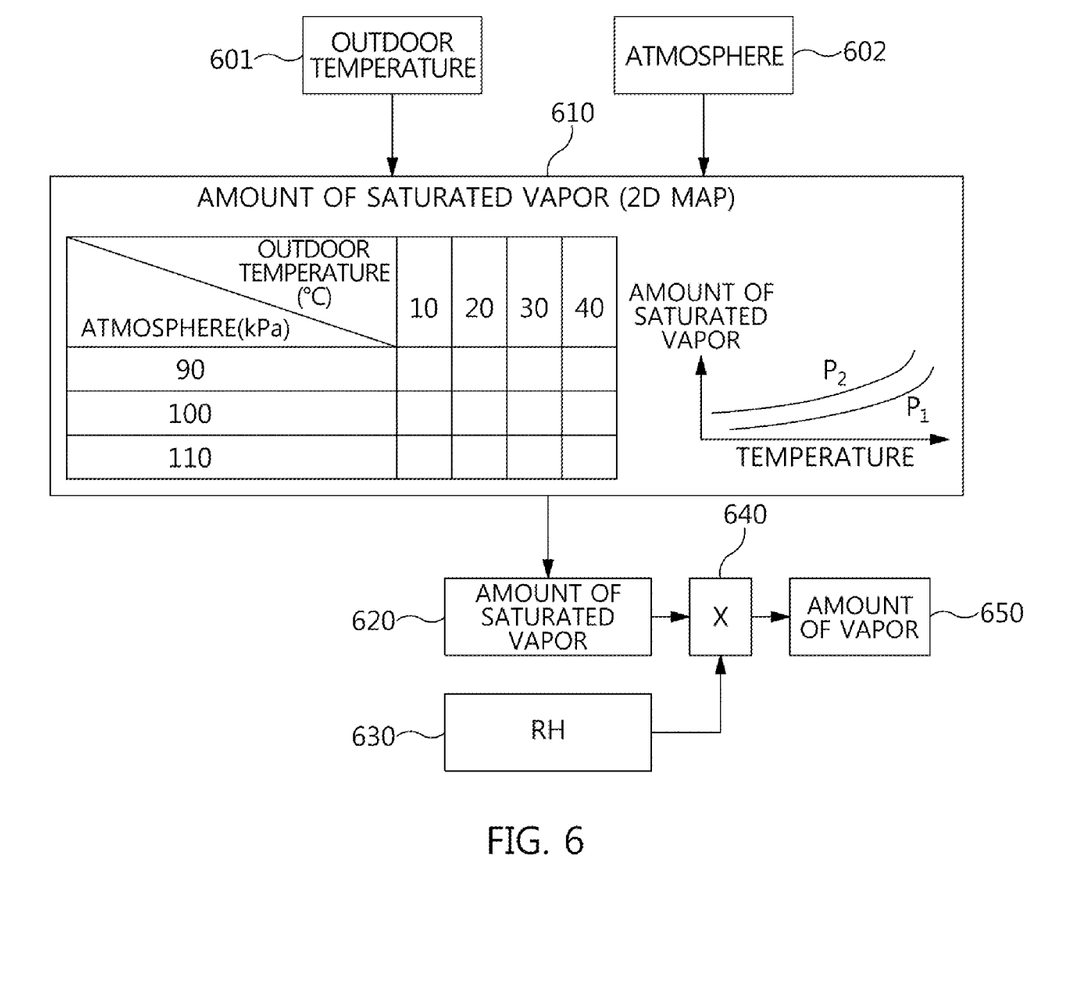
FIG. 6 is a schematic view showing a calculation of an amount of saturated vapor and an amount of general vapor according to one embodiment of the present disclosure.

FIG. 6 is a schematic view showing a calculation of an amount of saturated vapor and an amount of general vapor according to one embodiment of the present disclosure. Referring to FIG. 6, an input outdoor temperature 601, an input atmosphere 602, and the amount of saturated vapor are set in advance to calculate an amount of saturated vapor 620 through a saturated vapor map 610. The amount of saturated vapor 620 and relative humidity 630 are multiplied using a multiplier 640 to calculate a vapor amount 650.

The amount of generated rust in the case of rain, as represented by Expression 2 below, is obtained by reading the wiper operation time during exposure and previous traveling or by reading a value of the rain sensor from the storage unit 250 to calculate a rust generation rate. The rust generation rate is a function of the wiper operation time during previous traveling (or an average value of the rain sensor) and is calibrated through an experimental value.

$$R_r = k_r * t \quad \text{[Expression 2]}$$

where:
$R_r$=Amount of Generated Rust in Rain
$k_r$=Rust Generation Rate in Rain
t=Exposure (Soaking) Time In this embodiment, the rust generation rate in rain is a table map configured as a ratio according to the wiper operation time set by the experiment in advance, or a table map configured as a ratio according to an average value of a rain sensor value.

The amount of generated rust in leaving the vehicle parked for a long time is calculated by using the amount of generated rust because of rusting regardless of rain in leaving a vehicle parked for a long time or change in temperature and humidity. Additionally, the rust generation rate in leaving a vehicle parked for a long time is determined through experimentation as a variable. Therefore, the rust generation rate in leaving the vehicle parked for a long time is calculated as a product of the rust generation rate and the exposure time. At this time, the unit of the rust generation rate is [g/h], in other words, a rust generation rate per unit of exposure time and may be determined through the experiment of leaving a vehicle parked for a long time.

Figure 7:
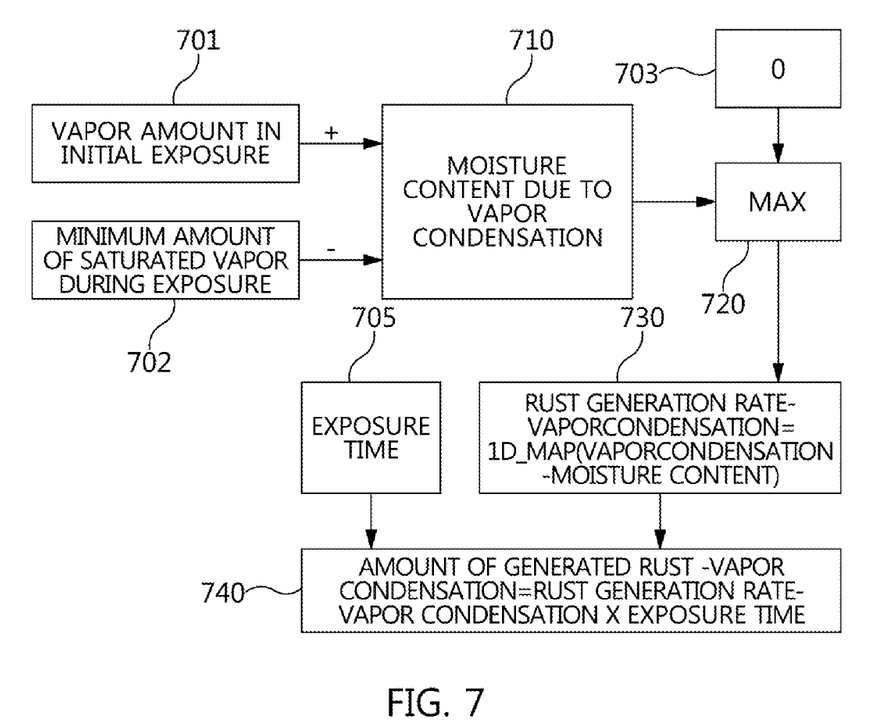
FIG. 7 is a schematic view showing a calculation of an amount of generated rust in vapor condensation according to one embodiment of the present disclosure.

FIG. 7 is a schematic view showing a calculation of an amount of generated rust in vapor condensation according to one embodiment of the present disclosure. Referring to FIG. 7, the temperature falls in the next morning when the vehicle has been left parked all night and moisture content due to vapor condensation occurs on the brake disk (110 in FIG. 1), thereby generating rust.

First, a moisture content 710 due to vapor condensation is calculated by subtracting the minimum amount of saturated vapor 702 during exposure from a vapor amount 701 in initial exposure. When the temperature falls during exposure and the amount of saturated vapor in the air becomes smaller than the amount of saturated vapor in initial exposure, the vapor condenses by subtracting value.

The amount of saturated vapor in initial exposure and the minimum amount of saturated vapor during exposure is received from the storage unit 250 and is calculated. At this time, since the vapor may not condense because the temperature does not fall, the minimum value 703 is set to be a value of 0.

The maximum moisture content 720 due to vapor condensation is calculated from the calculated moisture content 710 due to vapor condensation. A rust generation rate 730 due to vapor condensation is calculated from a table map (1D_MAP) which is modeled as a function of the maximum moisture content 720 due to vapor condensation as an independent variable.

Therefore, an amount of generated rust 740 in vapor condensation is calculated by multiplying the rust generation rate 730 in vapor condensation and the exposure time 705.

Figure 8:
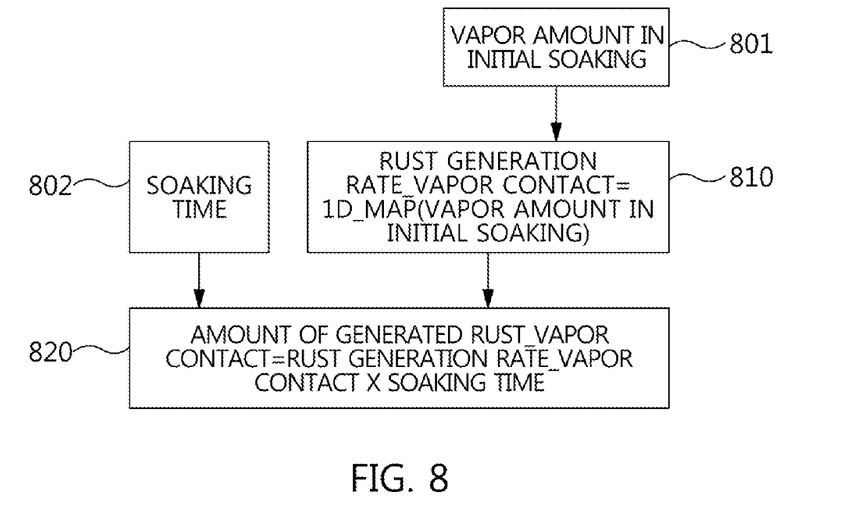
FIG. 8 is a schematic view showing a calculation of an amount of generated rust in vapor contact according to one embodiment of the present disclosure.

FIG. 8 is a schematic view showing a calculation of an amount of generated rust in vapor contact according to one embodiment of the present disclosure. FIG. 8, models the generation of rust when the brake disk comes into contact with the vapor even if the vapor does not condense. A rust generation rate 810 in vapor contact is calculated from the table map which is modeled as a function of the vapor amount in initial exposure as an independent variable through a vapor amount 801 in initial exposure. The longer the contact time of the vapor, the greater the generation amount, such that the amount of generated rust in vapor contact 820 is calculated by multiplying the rust generation rate 810 in vapor contact and an exposure time 802.

Figure 9:
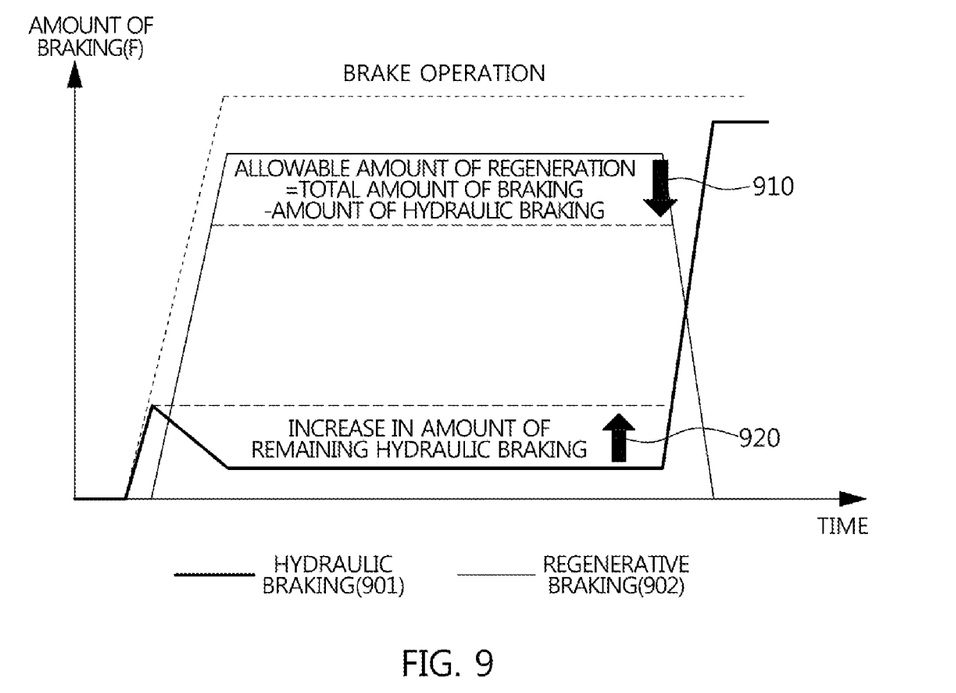
FIG. 9 is a graph schematically showing an execution in a rust removal mode according to one embodiment of the present disclosure.

FIG. 9 is a graph schematically showing an execution in a rust removal mode according to one embodiment of the present disclosure. Referring to FIG. 9, an allowable amount of regeneration braking 910 is reduced and an amount of hydraulic braking 920 is increased at the time of braking. In a normal control mode, the allowable amount of regeneration is determined by subtracting a total amount of braking determined by a brake depth and the remaining amount minus the amount of hydraulic braking.

On the contrary, in a rust removal control mode, the amount of remaining hydraulic braking from the total amount of braking is increased by the maximum value of the amount of generated rust minus the integral value of the amount of applied hydraulic pressure. The allowable amount of regeneration is reduced by an increasing amount of hydraulic pressure. As shown in FIG. 9, a curve 901 of hydraulic braking moves downward and a curve 902 of regenerative braking moves upward. The rust is removed by the amount of generated rust, such that the method for removing rust may vary depending on the cause of rust generation.

In addition, steps of the method or the algorithm which has been described regarding the embodiments of the present disclosure proposed herein are realized in the form of program instructions executable through various computer means such as a microprocessor, a processor, a central processing unit (CPU) and are recordable in a computer-readable medium. The computer-readable recording medium may include program instructions, data files, and data structures, alone or in combination.

The program instructions of the medium may be designed and configured specifically for the present disclosure or may be a type that is known and readily available to those having ordinary skill in the art. Examples of the computer-readable recording medium may include magnetic media such as a hard disk, a floppy disk, and a magnetic tape, an optical media such as a CD-ROM, a DVD, and Blue-ray, and a semiconductor storage element specially configured to store and execute a program (instruction) code such as a ROM, a RAM, and a flash memory.

Examples of a program instruction may include high-level language code executable by a computer using an interpreter in addition to machine code created by a compiler. The hardware device may be configured to operate as at least one software module to perform an operation of various embodiments and vice versa.

What is claimed is:
1. An apparatus for removing rust on a brake disk, comprising:
an environment information acquisition unit configured to acquire environment information;
a controller configured to perform a function of calculating an amount of generated rust using the environment information, and controlling the rust removal depending on whether or not the amount of generated rust exceeds a preset reference value; and
a driver configured to drive a brake system of a vehicle under the control of rust removal,
wherein an amount of hydraulic braking is increased as much as the amount of generated rust for a preset time immediately after the vehicle,
wherein an amount of rust removal is predicted by calculating an amount of applied hydraulic pressure whenever the hydraulic braking is performed,
wherein the amount of rust removal is proportional to the amount of hydraulic braking and the amount of applied hydraulic pressure,
wherein the control of rust removal is performed by reducing an allowable amount of regenerative braking and increasing the amount of hydraulic braking corresponding to the reduced allowable amount of regenerative braking to minimize deterioration of fuel effi- ciency when the regenerative braking is limited in order to remove rust on the brake disk, and wherein an amount of remaining hydraulic braking from a total amount of braking is increased by a maximum value of an amount of generated rust minus an integral value of an amount of applied hydraulic pressure.

2. The apparatus for removing rust on a brake disk according to claim 1, wherein the environment information is generated by using a measuring sensor installed in the environment information acquisition unit.

3. The apparatus for removing rust on a brake disk according to claim 2, wherein the amount of generated rust is any one of an amount of generated rust in rain calculated using a wiper operation in previous traveling and the measuring sensor, an amount of generated rust in leaving the vehicle parked for a long time calculated through a rust generation rate in leaving the vehicle parked for a long time set by experimentation in advance and a leaving time, an amount of generated rust in vapor condensation calculated by an amount of condensed vapor, which is obtained by subtracting a minimum amount of saturated vapor during exposure from a vapor amount immediately before exposure, and an exposure time, and an amount of generated rust in vapor contact calculated by the vapor amount immediately before the exposure and the exposure time.

4. The apparatus for removing rust on a brake disk according to claim 2, wherein the amount of generated rust is the maximum value in a plurality of the amounts of generated rust.

5. The apparatus for removing rust on a brake disk according to claim 4, wherein a control of rust removal is maintained or controlled by comparing the maximum value of the amount of generated rust and the integral value of the amount of applied hydraulic pressure, which is obtained by integrating a product of a proportionality constant and a vehicle speed into the amount of applied hydraulic pressure, with a reference value of an allowable amount of rust removal set in advance.

6. The apparatus for removing rust on a brake disk according to claim 1, wherein the environment information is acquired from a weather center.

7. The apparatus for removing rust on a brake disk according to claim 6, wherein the environment information is acquired from the weather center during exposure after starting the vehicle.

8. A method for removing rust on a brake disk, comprising:
acquiring environment information by an environment information acquisition unit;
calculating an amount of generated rust using the environment information by a controller;
determining whether or not the amount of generated rust exceeds a reference value set in advance by controller; and
driving, by a driver, a brake system of a vehicle by executing the control of rust removal by the controller, wherein an amount of hydraulic braking is increased as much as the amount of generated rust for a preset time immediately after the vehicle starts,
wherein an amount of rust removal is predicted by calculating an amount of applied hydraulic pressure whenever the hydraulic braking is performed,
wherein the amount of rust removal is proportional to the amount of hydraulic braking and the amount of applied hydraulic pressure,
wherein the control of rust removal is performed by reducing an allowable amount of regenerative braking and increasing the amount of hydraulic braking corresponding to the reduced allowable amount of regenerative braking to minimize deterioration of fuel efficiency when the regenerative braking is limited in order to remove rust on the brake disk, and
wherein an amount of remaining hydraulic braking from a total amount of braking is increased by a maximum value of an amount of generated rust minus an integral value of an amount of applied hydraulic pressure.

9. The method for removing rust on a brake disk according to claim 8, wherein the environment information is generated by using a measuring sensor installed in the environment information acquisition unit.

10. The method for removing rust on a brake disk according to claim 9, wherein the amount of generated rust is any one of an amount of generated rust in rain calculated using a wiper operation in previous traveling and the measuring sensor, an amount of generated rust in leaving the vehicle parked for a long time calculated through a rust generation rate in leaving the vehicle parked for a long time set by an experiment in advance and a leaving time, an amount of generated rust in vapor condensation calculated by an amount of condensed vapor, which is obtained by subtracting a minimum amount of saturated vapor during exposure from a vapor amount immediately before exposure, and an exposure time, and an amount of generated rust in vapor contact calculated by the vapor amount immediately before the exposure and the exposure time.

11. The method for removing rust on a brake disk according to claim 9, wherein the amount of generated rust is the maximum value in a plurality of the amounts of generated rust.

12. The method for removing rust on a brake disk according to claim 11, wherein a control of rust removal is maintained or controlled by comparing the maximum value of the amount of generated rust and the integral value of the amount of applied hydraulic pressure, which is obtained by integrating a product of a proportional constant and a vehicle speed into the amount of applied hydraulic pressure, with a reference value of an allowable amount of rust removal set in advance.

13. The method for removing rust on a brake disk according to claim 8, wherein the environment information is acquired from a weather center.

14. The method for removing rust on a brake disk according to claim 13, wherein the environment information is acquired from a weather center during exposure after starting the vehicle.

* * * * *